(12) United States Patent
Schauder et al.

(10) Patent No.: US 7,282,541 B2
(45) Date of Patent: Oct. 16, 2007

(54) FUNCTIONALIZED POLYPROPYLENE-BASED POLYMERS

(75) Inventors: Jean-Roch Schauder, Wavre (BE); Abdelhadi Sahnoune, Houston, TX (US); Sudhin Datta, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/393,136

(22) Filed: Mar. 30, 2006

(65) Prior Publication Data

US 2006/0211825 A1  Sep. 21, 2006

Related U.S. Application Data

(60) Continuation-in-part of application No. 11/075,353, filed on Mar. 8, 2005, which is a division of application No. 10/415,608, filed as application No. PCT/US01/32300 on Oct. 17, 2001, now Pat. No. 6,884,850.

(60) Provisional application No. 60/244,383, filed on Oct. 30, 2000.

(51) Int. Cl.
C08F 255/02 (2006.01)

(52) U.S. Cl. ............... 525/285; 525/240; 525/207; 525/221; 525/69; 526/348

(58) Field of Classification Search ............ 525/285, 525/240, 207, 221, 69; 526/348
See application file for complete search history.

(56) References Cited

U.S. PATENT DOCUMENTS

| | | | |
|---|---|---|---|
| 3,416,990 A | 12/1968 | Robinson, Jr. ............... 161/93 |
| 3,862,265 A | 1/1975 | Steinkamp et al. ...... 260/878 R |
| 4,159,287 A | 6/1979 | Ames ...................... 260/878 R |
| 4,780,228 A | 10/1988 | Gardiner et al. ............ 252/51 |
| 5,047,462 A | 9/1991 | Kehr et al. ................ 524/423 |
| 5,059,658 A | 10/1991 | Sezume et al. ............ 525/263 |
| 5,367,022 A | 11/1994 | Kiang et al. ................ 525/74 |
| 5,424,367 A | 6/1995 | Auda et al. ................ 525/285 |
| 5,439,974 A | 8/1995 | Mattson ..................... 525/74 |
| 5,451,639 A | 9/1995 | Marczinke et al. ......... 525/193 |
| 5,504,172 A | 4/1996 | Imuta et al. .............. 526/351 |
| 5,670,595 A | 9/1997 | Meka et al. .............. 526/336 |
| 5,763,088 A | 6/1998 | Nakano et al. .......... 428/424.8 |
| 5,998,039 A * | 12/1999 | Tanizaki et al. ........... 428/516 |
| 6,002,064 A | 12/1999 | Kobylivker et al. ........ 604/367 |
| 6,288,171 B2 | 9/2001 | Finerman et al. ............ 525/192 |
| 6,884,850 B2 | 4/2005 | Schauder et al. ........... 525/285 |
| 6,921,794 B2 * | 7/2005 | Cozewith et al. ........... 525/240 |
| 2005/0075441 A1 | 4/2005 | Onoe et al. ................ 524/474 |
| 2005/0176888 A1 | 8/2005 | Schauder et al. ........... 525/66 |

FOREIGN PATENT DOCUMENTS

| | | |
|---|---|---|
| EP | 0 767 182 | 4/1997 |
| EP | 0 770 641 | 5/1997 |
| EP | 0 777 693 | 6/1997 |
| EP | 0 964 011 | 12/1999 |
| GB | 879 195 | 10/1961 |
| GB | 1 040 539 | 8/1966 |
| GB | 1 531 188 | 11/1978 |
| GB | 2 022 597 | 12/1979 |
| GB | 1 578 049 | 10/1980 |
| WO | WO02/36651 | 5/2002 |
| WO | WO2005/049670 | 6/2005 |

OTHER PUBLICATIONS

S.B. Brown, in Reactive Extrusion, Chapter 4, entitled "Reactive Extrusion: A Survey of Chemical Reactions of Monomers and Polymers during Extrusion Processing" Polymer Processing Institute, pp. 75-199, New York, 1992.

Hu, Flat, and Lambia, Reactive Modifiers for Polymers, Blackie Academic & Professional, entitled "Free-Radical Grafting of Monomers onto Polymers by Reactive Extrusions: Principles and Applications", pp. 1-83, 1997.

Gaylord et al., Journal of Polymer Science: Polymer Letters Edition, Entitled "Nondegradative Reaction of Maleic Anhydride and Molten Polypropylene in the Presence of Peroxides" V21, pp. 23-30 (1983), New Jersey.

Modification of Polypropylene with Maleic Anhydride, Hogt, ANTEC '88 Proceedings of the 46th Annual Technical Conference, Atlanta, Apr. 18-21, 1988, p. 1478-1480.

The Maleic Anhydride Grafting of Polypropylene with Organic Peroxides, Callais et al., ANTEC '90 Plastics in the Environment: Yesterday, Today and Tomorrow, Conference Proceedings, Dallas TX, May 7-11, 1990, pp. 1921-1923.

M. Lambla in Makromol. Chem., Macromol. Symp. 75, entitled "Exchange and Free Radical Grafting Reactions in Reactive Extrusion", pp. 137-157, 1993.

W. Heinen et al., Macromolecules, 29, entitled "$^{13}$C NMR Study of the Grafting of Maleic Anhydride onto Polyethene, Polypropene, and Ethene—Propene Copolymers", p. 1151-1157, Netherlands, 1996.

Braun et al., Macromol. Symp. 129, entitled "Chemical Modification of Polymeric Hydrocarbons", pp. 43-51 (1998) Germany.

Heinen* et al., Macromol. Symp. 129, entitled $^{13}$C NMR Study of tho Grafting of $^{13}$C Labeled Maleic Anhydride onto PE, PP and EPM, pp. 119-125, The Netherlands.

* cited by examiner

Primary Examiner—James J. Seidleck
Assistant Examiner—Olga Asinovsky

(57) ABSTRACT

A process for preparing a functionalized propylene-based polymer and a functionalized polymer having a propylene-based polymer backbone is disclosed. The propylene-based polymer backbone can further comprise one or more alpha olefins.

45 Claims, No Drawings

FUNCTIONALIZED POLYPROPYLENE-BASED POLYMERS

CROSS REFERENCE TO RELATED APPLICATIONS

This application is a continuation-in-part of Ser. No. 11/075,353, filed Mar. 8, 2005, which is a divisional application of Ser. No. 10/415,608, filed Oct. 27, 2003, now U.S. Pat. No. 6,884,850, which is a National Stage Application of International Application No. PCT/US01/32300, filed Oct. 17, 2001, which claims the benefit of Provisional Application No. 60/244,383, filed Oct. 30, 2000.

FIELD OF INVENTION

Embodiments of the present invention relate to functionalized propylene-based polymers and processes for making the same. More particularly, embodiments of the present invention relate to functionalized propylene-diene copolymers and processes for making the same via peroxide grafting techniques.

BACKGROUND

Polypropylene-based graft copolymers are useful as compatibilizers for a variety of polymer blends containing polypropylene. Polypropylene-based graft copolymers can be used as a blend component as well as an adhesion promoter between polyolefins and other substrates, including glass, metal, mineral fillers, polar polymers, and engineering plastics such as polyamides.

Functionalized polypropylene-based polymers can be produced by peroxide grafting of polypropylene backbones. During peroxide grafting of a polyolefin backbone, free radicals are produced. Such radicals not only trigger a grafting reaction onto a polyolefin backbone, but can also cause beta-scission of the backbone itself. The resulting molecular weight reduction becomes more severe as the degree of grafting and severity of the process conditions increases. The beta-scission reaction is especially prevalent in the neighborhood of tertiary carbon atoms in the polyolefin backbone chain. The production of highly functionalized propylene based backbones by peroxide grafting involves an appreciable loss of molecular weight, viscosity, and melt strength.

For many years, polypropylene (PP) has also been functionalized with maleic anhydride in presence of peroxide to produce maleic anhydride grafted polypropylene, which is used as an adhesion promoter in glass and mineral filled polypropylene compounds as well as compatibilizer of polyamide polypropylene blends. The grafted polypropylene-based polymers are also used in other applications where adhesion onto metal or polar substrates (including polar polymers) is required. Lately, grafted polypropylene has also found applications as coupling agents in natural fibers filled PP compounds. During the grafting process, macroradicals are generated and beta scission usually occurs before the reaction with maleic anhydride takes place. The result is that grafting levels are generally low and the resulting functionalized polypropylene has a low molecular weight. In order to obtain highly functionalized polypropylene-based polymers, it is necessary to increase the amount of peroxide which leads to further MW reduction. It has also been recognized in prior literature (M. Lambla et al. in Makromol. Chem., Macromol. Symp., 75, 137 (1993)) that the grafting yield of maleic anhydride is not a monotonic function of its initial concentration but reaches a maximum before decreasing. The existence of the maximum is associated with a limited solubility of maleic anhydride in the molten polypropylene. It is believed that with increasing the maleic anhydride feed, the polypropylene/maleic anhydride/peroxide mixture changes from a semi-homogeneous to a more heterogeneous system with maleic anhydride/peroxide droplets dispersed in the molten polypropylene.

EP 777 693 discloses a maleated polypropylene having an acid number greater than 4.5, a yellowness index color of no greater than 76, and a number average molecular weight of at least 20,000. The acid number can be translated into a wt % content of maleic anhydride. The number average molecular weight can be converted in co-dependence with the Mw/Mn ratio into weight average Mw which changes inversely to the MFR. While EP 777 693 aims to provide a relatively high molecular weight and a high degree of grafting without undue yellowing at the same time, the flexibility remains insufficient and significant molecular weight breakdown still takes place.

U.S. Pat. No. 5,670,595 relates to diene modified polymers to improve the melt strength of polypropylenes, low draw-down ratios in extrusion coating, poor bubble formation in extrusion foam materials, and relative weakness in large-part blow molding. The dienes are acyclic alpha-omega dienes. The starting polymer contains less than 5 mol % of other unsaturated compounds such as ethylene, butene-1 etc. customarily used for Random Propylene Copolymers (RCP) used generally as a heat seal layer on oriented polypropylene (OPP) film. Use of the invention described is alleged to limit the molecular weight reduction to less than 20% when the graft ratio is 0.7 wt %. Contacting in solution and in the molten condition are illustrated. The materials lack the flexibility and low glass transition temperature desirable to preserve good adhesion at low temperature and when deformed by flexing or impact.

The grafting of a broad range of olefin based polymers is discussed in U.S. Pat. No. 5,367,022. A high degree of grafting is suggested combined with low MFR (i.e., high molecular weight) polymer backbones. The examples show that the grafting still results in a polymer with an MFR well in excess of 100, which has inadequate melt strength and is unsuited for use in film extrusion if used as the predominant component of a composition. The homopolymers are crystalline, have an elevated heat of fusion before grafting, and possess limited flexibility.

U.S. Pat. No. 5,059,658 discloses a method of producing modified polypropylene having a Mw from 50000 to 1000000 and a graft ratio of 0.1 to 10 wt % by graft-polymerizing a substantially crystalline propylene random copolymer consisting essentially of propylene and a linear diene. Although, it is mentioned that the backbone can contain up to 5 mole % comonomer, there is no discussion of the level of crystallinity or isotacticity of the polymer to be grafted.

U.S. Pat. No. 5,763,088 reports olefin resin-based articles having gas barrier properties consisting of a maleic anhydride grafted polypropylene. The starting backbone can include a propylene copolymer with a C2-C8 alpha-olefin have a melting point between 80° C. and 187° C. and a degree of crystallinity of 20% or more. The object of this invention has a crystallinity level and melting points outside these ranges.

WO 2002/36651 describes the grafting of propylene based elastomers containing ethylene derived units to lower crystallinity. WO 2005/049670 discloses incorporating dienes into propylene-based elastomers but the grafting of such material themselves is not disclosed.

Apart from changes in the polymer backbone to be grafted and the grafting process, it has also been proposed to counteract any reduction in the molecular weight as a result of peroxide grafting by blending the propylene based polymer with a polyethylene which has a countervailing tendency of increasing its molecular weight as the result of a peroxide grafting process. If large amounts of polyethylene are used melt processability and compatibility with polypropylene substrates can be negatively affected. Similarly higher molecular weight ungrafted propylene and or ethylene based polymers can be added to a grafted polymer with a degraded molecular weight to restore the overall melt strength to a sufficient level. In practice, thus far, grafted propylene based polymer compositions for applications such as CTR have been made, in spite of the absence of high molecular weight grafted propylene based polymer materials, by blending low viscosity functionalized propylene based polymers with high molecular weight un-functionalized propylene based polymers, or by the use of electron donating agents during grafting such as DMF or styrene to reduce chain scissioning. See Gaylord, N. G., Mishra, M. K., J. Polym. Sci. B21, 23 (1983) and (styrene use): Hu, G. H. Flat, J-J, Lambla, M, Makromol. Chem., Macromol. Symp. 75, 137 (1993).

The effectiveness of the former compositions is however reduced by reduction of the grafting level and broadening of the molecular weight distribution. The use of these latter chemicals generates safety issues on typical reactive extrusion processes in their handling and feeding to the reaction device. They also require more extensive venting in order to minimize their residual level in the final functionalized polymer. These residuals can also be seen as contaminations which prevent the final polymer to be used in certain applications such as those requiring food contact classification.

There is a need, therefore, for a grafted polymer which combines a high content of propylene derived units for improved compatibility with propylene based materials as well as a high degree of grafting to improve adhesion. There is also a need for a grafted propylene-based polymer with sufficient flexibility to maintain adhesion under local deformation at the same time as a sufficiently high viscosity to give a melt strength needed for extrusion.

SUMMARY OF THE INVENTION

A process for preparing a functionalized propylene-based polymer is provided. In at least one specific embodiment, the process includes contacting a propylene-based polymer backbone comprising propylene derived units, one or more dienes with a free-radical initiator and at least one ethylenically unsaturated carboxylic acid or acid derivative, such as maleic anhydride, the backbone having a triad tacticity of from 50 to 99% and a heat of fusion of less than 80 J/g. The at least one ethylenically unsaturated carboxylic acid or acid derivative is reacted with the backbone in the presence of the free-radical initiator under conditions at which free radicals are generated to graft the backbone and provide a grafted propylene copolymer, the grafted propylene-based polymer comprising from about 0.5 wt % to about 10 wt % of an unsaturated moiety derived from the one or more dienes incorporated into the backbone. The grafted propylene copolymer is pelletized to provide a pelletized propylene copolymer, wherein the pelletized propylene copolymer has a MFR ratio from about 0.01 to about 15.

In at least one other specific embodiment, the process includes contacting a propylene-based polymer backbone comprising propylene derived units, one or more alpha olefins, and one or more dienes with a free-radical initiator and at least one ethylenically unsaturated carboxylic acid or acid derivative, such as maleic anhydride, the backbone having a triad tacticity of from 50 to 99% and a heat of fusion of less than 80 J/g. The at least one ethylenically unsaturated carboxylic acid or acid derivative is reacted with the backbone in the presence of the free-radical initiator under conditions at which free radicals are generated to graft the backbone and provide a grafted propylene copolymer, the grafted propylene-based polymer comprising from about 0.5 wt % to about 10 wt % of an unsaturated moiety derived from the one or more dienes incorporated into the backbone. The grafted propylene copolymer is pelletized to provide a pelletized propylene copolymer, wherein the pelletized propylene copolymer has a MFR ratio from about 0.01 to about 15.

Also disclosed is a functionalized polymer comprising a propylene-based polymer backbone comprising one or more dienes, the backbone having an MFR (1.2 kg @ 190° C.) of from 0.1 g/10 min to 15 g/10 min, a content of at least one ethylenically unsaturated carboxylic acid or acid derivative derived units from about 1 wt % to about 3 wt %, a triad tacticity from about 50% to about 99%; and a heat of fusion of less than 80 J/g. Also disclosed is a maleated polymer comprising a propylene-based polymer backbone comprising one or more alpha olefins and one or more dienes, the backbone having an MFR (1.2 kg @ 190° C.) of from about 0.1 to about 6 g/10 min; a content of maleic anhydride derived units from about 1 wt % to about 3 wt %; a triad tacticity of from about 50% to about 99%; and a heat of fusion of less than 80 J/g.

DETAILED DESCRIPTION OF INVENTION

In one or more embodiments, a propylene-based polymer is grafted (functionalized) with at least one ethylenically unsaturated carboxylic acid or acid derivative, preferably in a single stage in the presence of a peroxide initiator. Many embodiments are discussed herein describing maleic anhydride as the preferred grafting monomer. Such embodiments may include an ethylenically unsaturated carboxylic acid or acid derivative other than the preferred maleic anhydride. The propylene-based polymer can be a propylene-α-olefin-diene terpolymer or propylene-diene copolymer. For simplicity and ease of description, the propylene-α-olefin-diene terpolymers or propylene-diene copolymers described herein will be simply referred to as a "propylene-based polymer." The terms functionalized and grafted are used interchangeably herein.

The propylene-based polymer when functionalized, exhibits a higher grafting level than one skilled in the art would expect, and can include isotactic sequences long enough to engender crystallinity. The propylene-based polymer contains a single hydrocarbon phase unlike the polymers of the prior art of the same composition, grafting level and tacticity (so called grafted reactor copolymers and impact copolymers) which typically consist of at least two distinct phases. In addition, the propylene-based polymer preferably is very flexible as determined by its flexural modulus (<350 MPa), has high elongation under a unidimensional tensile load of greater than 800%, and has a level of crystallinity much lower than expected from the prior art for their composition and tacticity of the propylene residues. The functionality level of the propylene-based polymer is greater than that for similarly grafted propylene homopolymers, and the functionality level of the propylene-based polymer increases with the increase in the level of the maleic anhydride feed. The level of the maleic anhydride feed can be as much as 5 wt %. Furthermore, the higher incorporation of functional groups is accomplished without a lower degree of molecular weight loss as in the case of propylene homopolymers.

Polymer Component

In at least one specific embodiment, the propylene-based polymer can be prepared by polymerizing propylene with one or more dienes. In at least one other specific embodiment, the propylene-based polymer can be prepared by polymerizing propylene with ethylene and/or at least one $C_4$-$C_{20}$ α-olefin, or a combination of ethylene and at least one $C_4$-$C_{20}$ α-olefin and one or more dienes. The one or more dienes can be conjugated or non-conjugated. Preferably, the one or more dienes are non-conjugated.

The comonomers can be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomer can include styrene.

Illustrative dienes can include but are not limited to 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD), and combinations thereof. Preferably, the diene is 5-ethylidene-2-norbornene (ENB).

Preferred methods for producing the propylene-based polymers are found in U.S. Patent Application Publication 20040236042 and U.S. Pat. No. 6,881,800, which are incorporated by reference herein.

Pyridine amine complexes, such as those described in WO03/040201 are also useful to produce the propylene-based polymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see Rieger EP1070087. The catalyst described in EP1614699 could also be used for the production of backbones suitable for the invention.

The propylene-based polymer can have an average propylene content on a weight percent basis of from about 60 wt % to about 99.7 wt %, more preferably from about 60 wt % to about 99.5 wt %, more preferably from about 60 wt % to about 97 wt %, more preferably from about 60 wt % to about 95 wt % based on the weight of the polymer. In one embodiment, the balance comprises diene. In another embodiment, the balance comprises one or more dienes and one or more of the α-olefins described previously. Other preferred ranges are from about 80 wt % to about 95 wt % propylene, more preferably from about 83 wt % to about 95 wt % propylene, more preferably from about 84 wt % to about 95 wt % propylene, and more preferably from about 84 wt % to about 94 wt % propylene based on the weight of the polymer. The balance of the propylene-based polymer comprises a diene and optionally, one or more alpha-olefins. In some embodiments, the alpha-olefin is butene, hexene or octene. In other embodiments, two alpha-olefins are present, preferably ethylene and one of butene, hexene or octene.

Preferably, the propylene-based polymer comprises about 0.3 wt % to about 24 wt %, of a non-conjugated diene based on the weight of the polymer, more preferably from about 0.5 wt % to about 12 wt %, more preferably about 0.6 wt % to about 8 wt %, and more preferably about 0.7 wt % to about 5 wt %. In other embodiments, the diene content ranges from about 0.3 wt % to about 10 wt %, more preferably from about 0.3 to about 5 wt %, more preferably from about 0.3 wt % to about 4 wt %, preferably from about 0.3 wt % to about 3.5 wt %, preferably from about 0.3 wt % to about 3.0 wt %, and preferably from about 0.3 wt % to about 2.5 wt % based on the weight of the polymer. In a preferred embodiment, the propylene-based polymer comprises ENB in an amount of from about 0.5 to about 4 wt %.

In other embodiments, the propylene-based polymer preferably comprises propylene and diene in one or more of the ranges described above with the balance comprising one or more $C_2$ and/or $C_4$-$C_{20}$ olefins. In general, this will amount to the propylene-based polymer preferably comprising from about 5 to about 40 wt % of one or more $C_2$ and/or $C_4$-$C_{20}$ olefins based the weight of the polymer. When $C_2$ and/or a $C_4$-$C_{20}$ olefins are present the combined amounts of these olefins in the polymer is preferably at least about 5 wt % and falling within the ranges described herein. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %.

The propylene-based polymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

In a preferred embodiment, the propylene-based polymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, wherein Mw is determined as described herein.

In a preferred embodiment, the propylene-based polymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

In a preferred embodiment, the propylene-based polymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be about 1.5 to 40. In an embodiment the MWD can have an upper limit of 40, or 20, or 10, or 5, or 4.5, and a lower limit of 1.5, or 1.8, or 2.0. In a preferred embodiment, the MWD of the propylene-based polymer is about 1.8 to 5 and most preferably about 1.8 to 3. Techniques for determining the molecular weight (Mn and Mw) and molecular weight distribution (MWD) can be found in U.S. Pat. No. 4,540,753 (Cozewith, Ju and Verstrate) (which is incorporated by reference herein for purposes of U.S. practices) and references cited therein, in Macromolecules, 1988, volume 21, p 3360 (Verstrate et al.), which is herein incorporated by reference for purposes of U.S. practice, and references cited therein, and in accordance with the procedures disclosed in U.S. Pat. No. 6,525, 157, column 5, lines 1-44, which patent is hereby incorporated by reference in its entirety.

In a preferred embodiment, the propylene-based polymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based polymer and $\eta_1$ is the intrinsic viscosity of a linear polymer of the same viscosity-averaged molecular weight ($M_v$) as the propylene-based polymer. $\eta_1 = KM_v^{\alpha}$, K and $\alpha$ were measured values for linear polymers and should be obtained on the same instrument as the one used for the g' index measurement.

In a preferred embodiment, the propylene-based polymer can have a crystallization temperature (Tc) measured with differential scanning calorimetry (DSC) of about 200° C. or less, more preferably, 150° C. or less, with 140° C. or less being more preferred.

In a preferred embodiment, the propylene-based polymer can have a density of about 0.85 g/cm³ to about 0.92 g/cm³, more preferably, about 0.87 g/cm³ to 0.90 g/cm³, more preferably about 0.88 g/cm³ to about 0.89 g/cm³ at room temperature as measured per the ASTM D-1505 test method.

In a preferred embodiment, the propylene-based polymer can have a melt flow rate (MFR, 2.16 kg weight @ 230° C.), equal to or greater than 0.2 g/10 min as measured according to the ASTM D-1238(A) test method as modified (described below). Preferably, the MFR (2.16 kg @ 230° C.) is from about 0.5 g/10 min to about 200 g/10 min and more preferably from about 1 g/10 min to about 100 g/10 min. In an embodiment, the propylene-based polymer has an MFR of 0.5 g/10 min to 200 g/10 min, especially from 2 g/10 min to 30 g/10 min, more preferably from 5 g/10 min to 30 g/10 min, more preferably 10 g/10 min to 30 g/10 min or more especially 10 g/10 min to about 25 g/10 min.

In an alternative procedure, the test is conducted in an identical fashion except using 1.2 kg at a temperature of 190° C., also referred to as the Melt Flow Rate (MFR (1.2 kg @ 190° C.). In some embodiments wherein the propylene-based polymer is a propylene-alpha olefin diene copolymer, the propylene-based polymer preferably has a Melt Flow Rate (1.2 kg @ 190° C.) according to ASTM D-1238 (A) of less than 15 g/10 min, more preferably 12 g/10 min or less, more preferably 10 g/10 min or less, more preferably 8 g/10 min or less, and even more preferably about 6 g/10 min or less.

The grafted polymer preferably has a MFR ratio (MFR (1.2 kg @ 190° C.) of grafted polymer to the MFR (1.2 kg @ 190° C.) of the starting polymer backbone) of from about 0.01 to about 10, more preferably from about 1 to about 10 and more preferably from about 1 to about 5, and more preferably from about 1 to about 4 and more preferably from about 1 to about 3. A higher ratio is representative of polymers giving high levels of chain scission whereas the polymers of the invention have low MFR ratio indicating low Mw change during the grafting process.

In one or more embodiments, the grafted propylene polymer has a shear thinning ratio greater than 15, more preferably $\geq 20$, more preferably $\geq 25$, more preferably $\geq 30$, more preferably $\geq 40$ and more preferably $\geq 50$.

The propylene-based polymer can have a Mooney viscosity ML (1+4)@125° C., as determined according to ASTM D1646, of less than 100, more preferably less than 75, even more preferably less than 60, most preferably less than 30.

In a preferred embodiment, the propylene-based polymer can have a heat of fusion (Hf) determined according to the DSC procedure described later, which is greater than or equal to about 0.5 Joules per gram (J/g), and is about $\leq 80$ J/g, preferably $\leq$ about 70 J/g, more preferably $\leq$ about 60 J/g, more preferably $\leq$ about 50 J/g, more preferably $\leq$ about 35 J/g. Also preferably, the propylene-based polymer has a heat of fusion that is greater than or equal to about 1 J/g, preferably greater than or equal to about 5 J/g. In another embodiment, the propylene-based polymer can have a heat of fusion (Hf), which is from about 0.5 J/g to about 70 J/g, preferably from about 1 J/g to about 70 J/g, more preferably from about 0.5 J/g to about 35 J/g. Preferred propylene-based polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 80 J/g.

The crystallinity of the propylene-based polymer can also be expressed in terms of percentage of crystallinity (i.e. % crystallinity). In a preferred embodiment, the propylene-based polymer has a % crystallinity of from 0.5% to 40%, preferably 1% to 30%, more preferably 5% to 25% wherein % crystallinity is determined according to the DSC procedure described above. In another embodiment, the propylene-based polymer preferably has a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 189 J/g.).

In addition to this level of crystallinity, the propylene-based polymer preferably has a single broad melting transition. However, the propylene-based polymer can show secondary melting peaks adjacent to the principal peak, but for purposes herein, such secondary melting peaks are considered together as a single melting point, with the highest of these peaks being considered the melting point of the propylene-based polymer.

The propylene-based polymer preferably has a melting point of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

The propylene-based polymer can have a triad tacticity of three propylene units, as measured by $^{13}C$ NMR of 75% or greater, 80% or greater, 82% or greater, 85% or greater, or 90% or greater. Preferred ranges include from about 50 to about 99%, more preferably from about 60 to about 99%, more preferably from about 75 to about 99% and more preferably from about 80 to about 99%; and in other embodiments from about 60 to about 97%. Triad tacticity is determined by the methods described in U.S. Patent Application Publication 20040236042.

In one or more embodiments above or elsewhere herein, the propylene-based polymer can be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

In one or more embodiments above or elsewhere herein, the propylene-based polymer can include a blend of two propylene-based polymers differing in the olefin content, the diene content, or both.

In a preferred embodiment, the propylene-based polymer can include a propylene based elastomeric polymer produced by random polymerization processes leading to polymers having randomly distributed irregularities in stereoregular propylene propagation. This is in contrast to block copolymers in which constituent parts of the same polymer chains are separately and sequentially polymerized.

In another embodiment, the propylene-based polymers can include copolymers prepared according the procedures in WO 02/36651 which is incorporated by reference here. Likewise, the propylene-based polymer can include polymers consistent with those described in WO 03/040201, WO 03/040202, WO 03/040095, WO 03/040201, WO 03/040233, and/or WO 03/040442. Additionally, the propylene-based polymer can include polymers consistent with those described in EP 1 233 191, and U.S. Pat. No. 6,525,157, along with suitable propylene homo- and copolymers described in U.S. Pat. No. 6,770,713 and U.S. Patent Application Publication 2005/215964, all of which are incorporated by reference. The propylene-based polymer can also include one or more polymers consistent with those described in EP 1 614 699 or EP 1 017 729.

The Grafting Monomer

The grafting monomer is at least one ethylenically unsaturated carboxylic acid or acid derivative, such as an acid anhydride, ester, salt, amide, imide, acrylates or the like. Such monomers include but are not necessary limited to the following: acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophtalic anhydride, norbornene-2,3-dicarboxylic acid anhydride, nadic anhydride, methyl nadic anhydride, himic anhydride, methyl himic anhydride, and x-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate.

Maleic anhydride is a preferred grafting monomer. As used herein, the term "grafting" denotes covalent bonding of the grafting monomer to a polymer chain of the polymeric composition. In some embodiments, the grafted propylene based polymer comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt. %, preferably at least about 0.5 wt. % and highly preferably about 1.5 wt. %.

Preparing Grafted Propylene-Based Polymers

The grafted polymeric products can be prepared in solution, in a fluidized bed reactor, or by melt grafting as desired. A particularly preferred grafted product can be conveniently prepared by melt blending the ungrafted polymeric composition, in the substantial absence of a solvent, with the free radical generating catalyst, such as a peroxide catalyst, in the presence of the grafting monomer in a shear-imparting reactor, such as an extruder reactor. Single screw but preferably twin screw extruder reactors such as co-rotating intermeshing extruder or counter-rotating non-intermeshing extruders but also co-kneaders such as those sold by Buss are especially preferred.

The preferred sequence of events used for the grafting reaction consists of melting the polymeric composition, adding and dispersing the grafting monomer, introducing the peroxide and venting the unreacted monomer and by-products resulting from the peroxide decomposition. Other sequences can include feeding "the monomers and the peroxide pre-dissolved in a solvent.

The monomer is typically introduced to the reactor at a rate of about 0.01 to about 10 wt. % of the total of the polymeric composition and monomer, and preferably at about 1 to about 5 wt. % based on the total reaction mixture weight. The grafting reaction is carried at a temperature selected to minimize or avoid rapid vaporization and consequent losses of the peroxide and monomer and to have residence times about 6 to 7 times the half life time of the peroxide. A temperature profile where the temperature of the polymer melts increases gradually through the length of the reactor up to a maximum in the grafting reaction zone of the reactor, and then decreases toward the reactor output is preferred. Temperature attenuation in the last sections of the extruder is desirable for product pelletizing purposes.

In order to optimize the consistency of feeding, the peroxide is usually dissolved at concentrations ranging from 10 to 50 wt % in a mineral oil whereas the polymer and the grafting monomer are fed neat. Illustrative catalysts include but are not limited to: diacyl peroxides such as benzoyl peroxide; peroxyesters such as tert-butyl peroxy benzoate, tert-butylperoxy acetate, 00-tert-butyl-0-(2-ethylhexyl) monoperoxy carbonate; peroxyketals such as n-butyl-4,4-di-(tert-butylperoxy) valerate; and dialkyl peroxides such as 1,1-bis(tertbutylperoxy) cyclohexane, 1,1-bis(tert-butylperoxy)-3,3,5-trimethylcyclohexane, 2,2-bis(tert-butylperoxy) butane, dicumylperoxide, tert-butylcumylperoxide, Di-(2-tert-butylperoxy-isopropyl-(2))benzene, di-tert-butylperoxide (DTBP), 2,5-dimethyl-2,5-di(tert-butylperoxy)-hexane, 2,5-dimethyl-2,5-di(tert-butylperoxy)-hexyne, 3,3,5,7,7-pentamethyl 1,2,4-trioxepane; and the like.

In a preferred embodiment, the polymer backbone is reacted with the at least one ethylenically unsaturated carboxylic acid or acid derivative in a continuous melt extruder with at least 0.2 wt % of the at least one ethylenically unsaturated carboxylic acid or acid derivative and at least 0.001 wt % of the peroxide initiator.

Styrene and derivatives thereof such as paramethyl styrene, or other higher alkyl substituted styrenes such as t-butyl styrene can be used as a charge transfer agent in presence of maleic anhydride to inhibit chain scissioning. This allows further minimization of the beta scission reaction and the production of a higher molecular weight grafted polymer (MFR=1.5).

Properties of Grafted Polymeric Products

MFR (1.2 kg @ 190° C.) of ungrafted polymer backbone and grafted polymer was measured according to a modified ASTM D-1238(A) at 190° C., 1.2 kg weight. The ASTM D-1238(A) was modified as follows: Preheating of the polymer in the barrel was performed for 4 minutes instead of 7 minutes according to ASTM D-1238(A). Wherever ASTM D-1238(A) is mentioned in the application, it is meant modified ASTM D-1238(A) as described in this paragraph.

The MFR ratio was obtained by dividing the MFR of the grafted polymer by the MFR of the starting backbone as described earlier.

The shear thinning ratio was calculated by dividing low shear rate viscosity by high shear rate viscosity. The low shear and high shear viscosities were measured by a sweep of frequencies from 0.31 to 201.06 radiant/sec at 100° C. on a dynamic analyzer, such as a Rubber Processing Analyzer RPA 2000 from Alpha Technologies Co. The low shear viscosity was the viscosity at 0.31 rad/sec, and the high shear viscosity was the viscosity at 201.06 rad/sec.

The ethylene comonomer content was measured by Fourier Transform Infrared Spectroscopy (FTIR). This method produces an ethylene content based on the weight of the propylene and ethylene in the polymer. When the polymer comprises a diene, the diene content can be measured as indicated below, and the overall ethylene content based on the weight of the polymer, including all monomers, can be determined.

The amount of diene present can be inferred by the quantitative measure of the amount of the pendant free olefin present in the polymer after polymerization. Several procedures such as iodine number and the determination of the olefin content by $^1H$ or $^{13}C$ nuclear magnetic resonance (NMR) have been established. In embodiments described herein where the diene was ENB, the amount of diene was measured according to ASTM D3900.

Maleic anhydride (MA) content was measured by FTIR. A thin polymer film is pressed from 2-3 pellets at 165° C. When the film is used as such, the maleic anhydride content is reported as before oven. The film is than placed in a vacuum oven at 105° C. for 1 h and placed in the FTIR; the measured maleic anhydride content is reported as after oven. The peak height of the anhydride absorption band at 1790 cm$^{-1}$ and of the acid absorption band (from anhydride hydrolysis in air) at 1712 cm$^{-1}$ was compared with a band at 4324 cm$^{-1}$ serving as a standard. The total percentage of maleic anhydride (% MA) was then calculated by the formula:

$$\% MA = a + k(A_{1790} + A_{1712})/A_{4324},$$

where "a" and "k" are constants determined by internal calibration with internal standards and having values 0.078 and 0.127, respectively.

The maleic anhydride content of the grafted propylene-based polymers used as the standards was determined according to following procedure. A sample of grafted polymer was first purified from residual monomer by complete solubilization in xylene followed by re-precipitation in acetone. This precipitated polymer was then dried in a vacuum oven at 200° C. for 2 hours in order to convert all maleic acid into anhydride. 0.5 to 1 grams of re-precipitated polymer was dissolved in 150 mL of toluene. The solution was heated at toluene reflux for 1 hour and 5 drops of a 1% bromothymol blue solution in MeOH were added. The solution was titrated with a solution of 0.1 N tetrabutyl ammonium hydroxide in methanol (color change from yellow to blue). The amount of the tetrabutyl ammonium hydroxide solution used to neutralize the anhydride during the titration was directly proportional to the amount of grafted maleic anhydride present in the polymer.

Differential Scanning Calorimetry procedure: About 0.5 grams of polymer was weighed out and pressed to a thickness of ~15-20 mils (~381-508 microns) at ~140° C.-150° C., using a "DSC mold" and Mylar as a backing sheet. The pressed pad was allowed to cool to ambient temperature by hanging in air (the Mylar is not removed). The pressed pad was annealed at room temperature (23-25° C.) for ~8 days. At the end of this period, a ~15-20 mg disc was removed from the pressed pad using a punch die and placed in a 10 microliter aluminum sample pan. The sample was placed in a Differential Scanning Calorimeter (Perkin Elmer Pyris 1 Thermal Analysis System) and cooled to about −100° C. The sample was heated at 10° C./min to attain a final temperature of about 165° C. The thermal output, recorded as the area under the melting peak of the sample, was a measure of the heat of fusion and expressed in Joules per gram of polymer and automatically calculated by the Perkin Elmer System. The melting point was recorded as the temperature of the greatest heat absorption within the range of melting of the sample relative to a baseline measurement for the increasing heat capacity of the polymer as a function of temperature.

EXAMPLES

The foregoing discussion can be further described with reference to the following non-limiting examples. In the tables below, the designation "nm" means not measured.

Polymers 1 and 2 are propylene ethylene copolymers that do not contain a diene, i.e. comparative polymers. Polymer 1 was a propylene-ethylene polymer commercially available from ExxonMobil Chemical Company as Vistamaxx™ 6100. Polymer 2 was a propylene-ethylene polymer commercially available from ExxonMobil Chemical Company as Vistamaxx™ 3000

Polymers 3-6 are propylene ethylene copolymers containing from 2 wt % to 4 wt % of ENB (i.e., a propylene-based polymer as described). Polymerization was conducted as follows. In a 27 liter continuous flow stirred tank reactor equipped with dual pitched blade turbine agitators, 83 kg of dry hexane, 24 kg of propylene, 1.5 to 2.0 kg of ethylene, 0.6 to 1.4 kg of 5-ethylidene-2-norbornene (ENB) were added per hour. The reactor was agitated at 700 rpm during the course of the reaction and was maintained liquid full at about 1600 psi pressure (gauge) so that all regions in the polymerization zone had the same composition during the entire course of the polymerization. A catalyst solution in toluene of 1.5610-3 grams of dimethylsilylindenyl dimethyl hafnium and 2.42×10$^{-3}$ grams of dimethylanilinium tetrakis (heptafluoronaphthyl) borate was added at a rate of 6.35 ml/min to initiate the polymerization. An additional solution of tri-n-octyl aluminum (TNOA) was added to remove extraneous moisture during the polymerization. The polymerization was conducted at 58 to 60° C. in an adiabatic reactor. The feed was cooled to between −3 to 3° C. The polymerization was efficient and led to the formation of about 8 to 11 kg of polymer per hour. The polymers were recovered by three stage removal of the solvent, first by removing about 70% of the solvent using a lower critical solution process as described in WO0234795A1, and then removing the remaining solvent in a flash pot followed by further devolatilization in a LIST devolatization extruder. The polymers were recovered as pellets. The polymers analysis results are shown in Table 2. The catalyst feed in Table 1 contains from 5 to 17.32×10$^{-4}$ mol/liter of the catalysts in toluene, and the activator feed contains and approximately from 4.9 to 9.3×10$^{-4}$ mol/liter of the activator in toluene. Both feeds are introduced into the polymerization reactor after an initial premixing for about 60 seconds at the rates indicated below.

TABLE 1

| Sample # | Ethylene Feed (kg/hr) | Propylene Feed (kg/hr) | ENB (kg/hr) | Catalyst Concentration ($\times 10^{-4}$ mol/l) | Activator Concentration ($\times 10^{-4}$ mol/l) | Hexane feed (kg/hr) | Reactor Temperature (° C.) |
|---|---|---|---|---|---|---|---|
| Polymer 3 | 2.10 | 24.39 | 0.65 | 5.05 | 4.90 | 81.85 | 69.5 |
| Polymer 4 | 1.65 | 24.39 | 0.69 | 7.58 | 4.90 | 83.25 | 63.3 |
| Polymer 5 | 1.10 | 24.41 | 0.65 | 9.52 | 9.25 | 83.63 | 61.4 |
| Polymer 6 | 1.24 | 24.38 | 1.41 | 17.32 | 5.60 | 83.59 | 60.2 |

TABLE 2

| Polymer | C2[A] (wt %) | ENB[B] (wt %) | MFR (1.2 kg @ 190° C.) (g/10 min) | Tm (° C.) | Heat of fusion (J/g) | Triad tacticity (%) | MFR (230° C. @ 2.16 kg) (g/10 min) |
|---|---|---|---|---|---|---|---|
| 1 | 12 |  | 1.5 | 67 | 29 | 90 | nm |
| 2 | 16 |  | 0.7 | 49 | 5 | 91 | nm |
| 3 | 16.3 | 2.0 | 0.9 | 48 | 9 | nm | 3.6 |
| 4 | 13.4 | 2.0 | 0.8 | 59 | 24 | nm | 3.8 |
| 5 | 9.4 | 1.95 | 1.2 | nm | nm | 95 | 4.4 |
| 6 | 9.8 | 4.0 | 0.9 | nm | nm | 96 | 5.8 |

[A]C2 (ethylene) content based on combined amount of propylene and ethylene
[B]ENB content determined by ASTM D-3900 and based on weight of polymer The polymers were grafted on a non-intermeshing counter-rotating twin screw extruder (30 cm, L/D=48) under the following conditions: 97.5 to 98.5 weight % of polymer, 0.5 or 2.5 weight % of Crystalman™ Maleic Anhydride were fed at 7 kg/h feed rate to the hopper of the extruder and 0.5 weight % of a 10% solution of Luperox™ 101 dissolved in Marcol™ 52 oil were added to the second barrel. The screw speed was set at 125 rpm and following temperature profile was used: 180° C., 190° C., 190° C., 190° C. with the die at 180° C. Excess reagents as well as peroxide decomposition products were removed with vacuum prior to polymer recovery.

Table 3 shows polymers 3-6 (those containing diene) when reacted with high amounts of peroxide and maleic anhydride gave functionalized polymers having a low MFR (i.e., high molecular weight, or a low MFR ratio between MFR of the functionalized (grafted) polymer and the originally used backbone, which indicates a small viscosity change during the grafting. Under the same conditions, the polymers 1 and 2 without diene lead to a higher MFR and higher MFR ratio as well as a lower shear thinning ratio.

TABLE 3

| | Example | | | | | |
|---|---|---|---|---|---|---|
| | 1 (Comparative) | 2 (Comparative) | 3 | 4 | 5 | 6 |
| Polymer 1 | 97.0 | | | | | |
| Polymer 2 | | 97.0 | | | | |
| Polymer 3 | | | 97.0 | | | |
| Polymer 4 | | | | 97.0 | | |
| Polymer 5 | | | | | 97.0 | |
| Polymer 6 | | | | | | 97.0 |
| MA % added | 2.5 | 2.5 | 2.5 | 2.5 | 2.5 | 2.5 |
| Luperox 130 | 0.5 | 0.5 | 0.5 | 0.5 | 0.5 | 0.5 |
| MA wt % before oven | 1.4 | 1.5 | 1.7 | 1.6 | 1.7 | 1.8 |
| MA wt % after oven | 1.3 | 1.5 | 1.6 | 1.6 | 1.7 | 1.7 |
| MFR of grafted polymer (1.2 kg @ 190° C.) | 46 | 34 | 1.3 | 1.5 | 3.8 | 0.1 |
| MFR ratio | 31 | 48 | 1.4 | 1.9 | 4.2 | 0.04 |
| shear thinning Ratio | 11 | 11 | 71 | 59 | nm | 111 |

The propylene-based polymer backbones containing dienes permit the use of increased amounts of peroxide and maleic anhydride for a given final MFR of the functionalized polymer as shown in Table 4 below. Under the same conditions, the comparative polymers, polymer 1 and 2, provided much higher MFR and MFR ratio.

TABLE 4

| | Example | | | | | | | | |
|---|---|---|---|---|---|---|---|---|---|
| | 7 (Comparative) | 8 (Comparative) | 9 (Comparative) | 10 | 11 | 12 | 13 | 14 | 15 |
| Polymer 2 | 98.95 | 98.85 | 97.0 | | | | | | |
| Polymer 5 | | | | 98.95 | 98.85 | 97.0 | | | |

TABLE 4-continued

| | Example | | | | | | | | |
|---|---|---|---|---|---|---|---|---|---|
| | 7 (Comparative) | 8 (Comparative) | 9 (Comparative) | 10 | 11 | 12 | 13 | 14 | 15 |
| Polymer 6 | | | | | | | 98.95 | 98.85 | 97.0 |
| MA % added | 1.0 | 1.0 | 2.5 | 1.0 | 1.0 | 2.5 | 1.0 | 1.0 | 2.5 |
| Luperox 130 | 0.05 | 0.15 | 0.5 | 0.05 | 0.15 | 0.5 | 0.05 | 0.15 | 0.5 |
| MA wt % before oven | 0.5 | 0.7 | 1.5 | 0.6 | 0.7 | 1.7 | 0.6 | 0.8 | 1.6 |
| MA wt % after oven | 0.5 | 0.6 | 1.5 | 0.6 | 0.7 | 1.6 | 0.6 | 0.7 | 1.6 |
| MFR of grafted polymer (1.2 kg @ 190° C.) | 8 | 16 | 34 | 2.4 | 2.4 | 1.3 | 2.1 | 2.0 | 1.5 |
| MFR ratio | 11 | 22 | 48 | 2.6 | 2.6 | 1.4 | 2.6 | 2.4 | 1.9 |
| shear thinning Ratio | 14 | nm | 11 | 38 | nm | 71 | nm | nm | 59 |

Various terms as used herein are defined. To the extent a term used in a claim is not defined, it should be given the broadest definition persons in the pertinent art have given that term as reflected in at least one printed publication or issued patent. Furthermore, certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. Furthermore, all patents, test procedures, and other documents cited in this application are fully incorporated by reference. While the foregoing is directed to embodiments of the present invention, other and further embodiments of the invention can be devised without departing from the basic scope thereof, and the scope thereof is determined by the claims that follow.

We claim:

1. A process for preparing a functionalized propylene-based polymer comprising:
   contacting (i) a propylene-based polymer backbone comprising propylene derived units and one or more dienes with (ii) a free-radical initiator and (iii) at least one ethylenically unsaturated carboxylic acid or acid derivative, the backbone having a triad tacticity of from 50 to 99% and a heat of fusion of less than 80 J/g;
   reacting the at least one ethylenically unsaturated carboxylic acid or acid derivative with the backbone in the presence of the free-radical initiator wider conditions at which free radicals are generated to graft the backbone and provide a grafted propylene copolymer, the grafted propylene-based polymer comprising from about 0.3 wt % to about 10 wt % of one or more dienes; and
   pelletizing the grafted propylene copolymer to provide a pelletized grafted propylene copolymer, wherein the pellerized grafted propylene copolymer has a MFR (1.2 kg @ 190° C.) of from about 0.01 g/10 min to about 10 g/10 min.

2. The process of claim 1, wherein the MFR of the pelletized grafted propylene copolymer to the original backbone is from about 1 g/10 min to about 5 g/10 min.

3. The process of claim 1, wherein the shear thinning ratio of the pelletized grafted propylene copolymer is greater than 15.

4. The process of claim 1 comprising reacting the at least one ethylenically unsaturated carboxylic acid or acid derivative with the backbone in a continuous melt extruder with at least 0.2 wt % of the ethylenically unsaturated carboxylic acid or acid derivative and at least 0.001 wt % of a peroxide initiator.

5. The process of claim 1, wherein the backbone before grafting comprises from 0.5 to 4 wt % of ENB.

6. The process of claim 1, wherein the backbone before grafting has a heat of fusion from about 1 J/g to about 35 J/g.

7. The process of claim 1, wherein the backbone has a triad tacticity before grafting from about 60% to about 97%.

8. The process of claim 1, wherein the backbone before grafting further comprises units derived from an alpha-olefin other than the propylene derived units and the one or more dienes in an amount from about 5 wt % to about 40 wt %.

9. The process of claim 8, wherein the backbone before grafting comprises units derived from ethylene, butene, hexene and/or octene.

10. The process of claim 9, wherein the backbone before grafting comprises from about 5 wt % to about 40 wt % of units derived from ethylene and/or butene.

11. The process of claim 9, wherein the backbone before grafting comprises from about 5 wt % to about 40 wt % of units derived from ethylene and/or hexene.

12. The process of claim 1 wherein the at least one ethylenically unsaturated carboxylic acid or acid derivative comprises maleic anhydride, methyl methacrylate, acrylic acid, methacrylic acid, hydroxyethyl methacrylate, hydroxypropyl methacrylate or glycidyl methacrylate.

13. A functionalized polymer comprising a propylene-based polymer backbone comprising one or more dienes, the backbone having:
   an MER (1.2 kg @ 190° C.) of from 0.1 g/10 min to 15 g/10 min;
   a content of at least one ethylenically unsaturated carboxylic acid or acid derivative derived units from about 1 wt % to about 3 wt %;
   a triad tacticity from about 50% to about 99%; and
   a beat of fusion of less than 80 J/g.

14. The polymer of claim 13, wherein the at least one ethylenically unsaturated carboxylic acid or acid derivative comprises maleic anhydride, methyl methacrylate, acrylic acid, methacrylic acid, or glicydyl methacrylate.

15. The polymer of claim 13, wherein the backbone comprises disruptions caused by (i) inclusion of comonomer, (ii) irregular placement of propylene-derived units, or (iii) or combination of (i) and (ii).

16. The polymer of claim 14, wherein reacting the maleic anhydride with the backbone is conducted in a continuous melt extruder with at least 0.2 wt % of maleic anhydride and at least 0.001 wt % of a peroxide initiator.

17. The polymer of claim 13, wherein the backbone before grafting comprises from 0.5 wt % to 4 wt % of ENB.

18. The polymer of claim 13, wherein the backbone before grafting has a heat of fusion from about 1 J/g to about 35 J/g.

19. The polymer of claim 13, wherein the backbone has a triad tacticity before grafting from about 60% to about 97%.

20. The polymer of claim 13, wherein the backbone before grafting comprises units derived from a comonomer, other than propylene and the one or more dienes, in an amount from about 5 wt % to about 40 wt %.

21. The polymer of claim 20, wherein the backbone before grafting comprises units derived from ethylene, butene, hexene and/or octene.

22. The polymer of claim 21, wherein the backbone before grafting comprises from about 5 wt % to about 35 wt % of units derived from ethylene and/or butene.

23. The polymer of claim 21, wherein the backbone before grafting comprises from about 5 wt % to about 35 wt % of units derived from ethylene and/or hexene.

24. A process for preparing a functionalized propylene-based polymer comprising:
    contacting (i) a propylene-based polymer backbone comprising propylene derived units, one or more alpha olefins and from about 0.3 to about 10 wt % of one or more dienes with (ii) a free-radical initiator and (iii) at least one ethylenically unsaturated carboxylic acid or acid derivative, the backbone having a triad tacticity of from about 50 to about 99% and a heat of fusion of less than 80 J/g;
    reacting the at least one ethylenically unsaturated carboxylic acid or acid derivative with the backbone in the presence of the free-radical initiator under conditions at which free radicals are generated to graft the backbone and provide a grafted propylene copolymer; and
    pelletizing the grafted propylene copolymer to provide a pelletized grafted propylene copolymer having a MFR (1.2 kg @ 190° C.) of from about 0.01 g/10 min to about 10 g/10 min.

25. The process of claim 24, wherein the one or more alpha olefins comprises ethylene.

26. The process of claim 24, wherein the MFR of the pelletized grafted propylene copolymer is from about 1 to about 5.

27. The process of claim 24, wherein the shear thinning ratio of the pelletized grafted propylene copolymer is greater than 15.

28. The process of claim 24 comprising reacting the at least one ethylenically unsaturated carboxylic acid or acid derivative with the backbone in a continuous melt extruder with at least 0.2 wt % of at least one ethylenically unsaturated carboxylic acid or acid derivative and at least 0.001 wt % of a peroxide initiator.

29. The process of claim 24, wherein the backbone before grafting comprises from 0.5 wt % to 4 wt % of ENB.

30. The process of claim 24, wherein the backbone before grafting has a heat of fusion from about 1 J/g to about 35 J/g.

31. The process of claim 24, wherein the backbone has a triad tacticity before grafting from about 60% to about 97%.

32. The process of claim 24, wherein the backbone before grafting further comprises units derived from a comonomer, other than propylene and one or more dienes, in an amount from about 5 wt % to about 40 wt %.

33. The process of claim 32, wherein the backbone before grafting comprises units derived from ethylene, butene, hexene and/or octene.

34. The process of claim 33, wherein the backbone before grafting comprises from about 5 wt % to about 35 wt % of units derived from ethylene and/or butene.

35. The process of claim 33, wherein the backbone before grafting comprises from about 5 wt % to about 35 wt % of units derived from ethylene and/or hexene.

36. The process of claim 24, wherein the shear thinning ratio of the pelletized grafted propylene copolymer is above 20.

37. The process of claim 24 wherein the at least one ethylenically unsaturated carboxylic acid or acid derivative comprises maleic anhydride, methyl methacrylate, acrylic acid, methacrylic acid, hydroxyethyl methacrylate, hydroxypropyl methacrylate or glicydyl methacrylate.

38. A maleated polymer comprising a propylene-based polymer backbone comprising one or more alpha olefins and one or more dienes, the backbone having:
    an MFR (1.2 kg @ 190° C.) of from about 0.1 to about 6 g/10 min;
    a content of maleic anhydride derived units from about 1 wt % to about 3 wt %;
    a triad tacticity of from about 50% to about 99%; and
    a heat of fusion of less than 80 J/g.

39. The polymer of claim 38, wherein the one or more alpha-olefins comprise ethylene, butene, hexene and/or octene.

40. The polymer of claim 38, wherein the backbone before grafting comprises from about 5 wt % to about 35 wt % of olefin units derived from ethylene, butene, hexene and/or octene.

41. The polymer of claim 38, wherein the backbone before grafting comprises from about 5 wt % to about 35 wt % of units derived from ethylene and/or hexene.

42. The polymer of claim 38, wherein the backbone before grafting comprises from about 5 wt % to about 35 wt % of units derived from ethylene and/or hexene.

43. The polymer of claim 38, wherein the backbone before grafting comprises from 0.5 wt % to 4 wt % of ENB.

44. The polymer of claim 38, wherein the backbone before grafting has a heat of fusion from about 1 J/g to about 35 J/g.

45. The polymer claim 38, wherein the backbone has a triad tacticity before grafting from about 60% to about 97%.

* * * * *